Patented Mar. 10, 1953

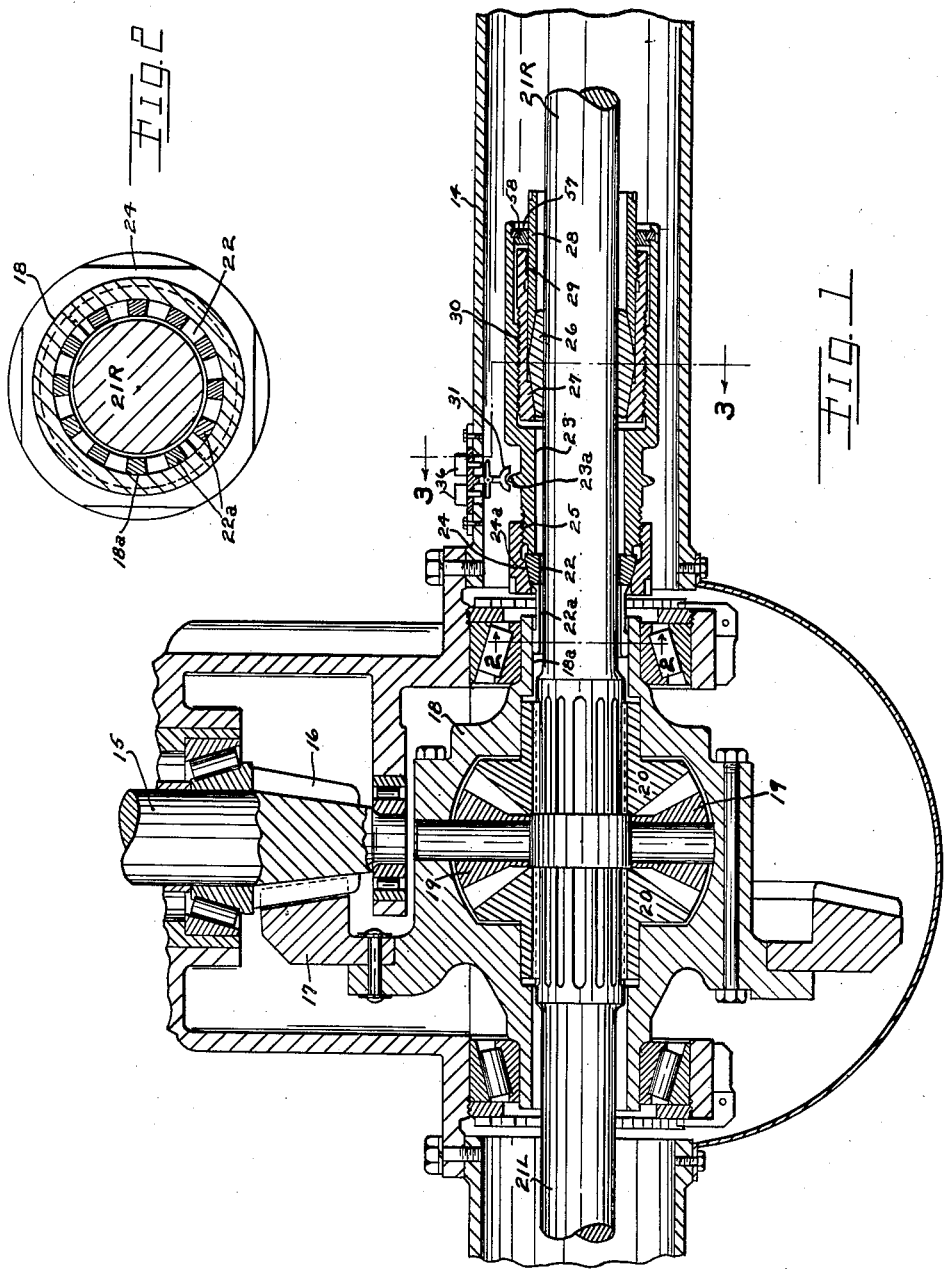

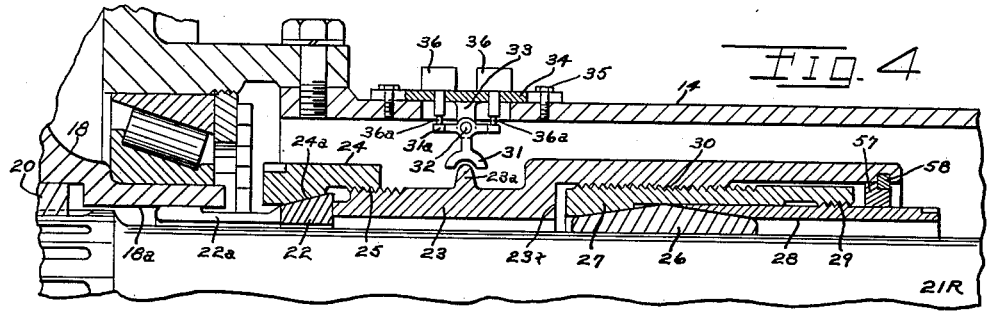
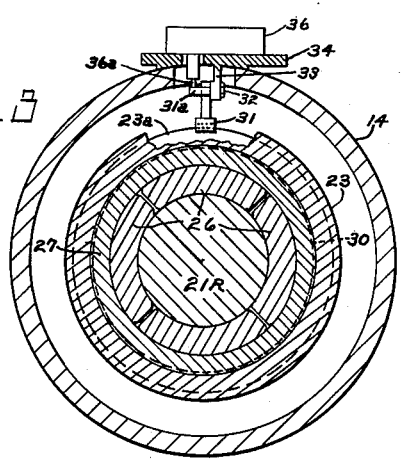
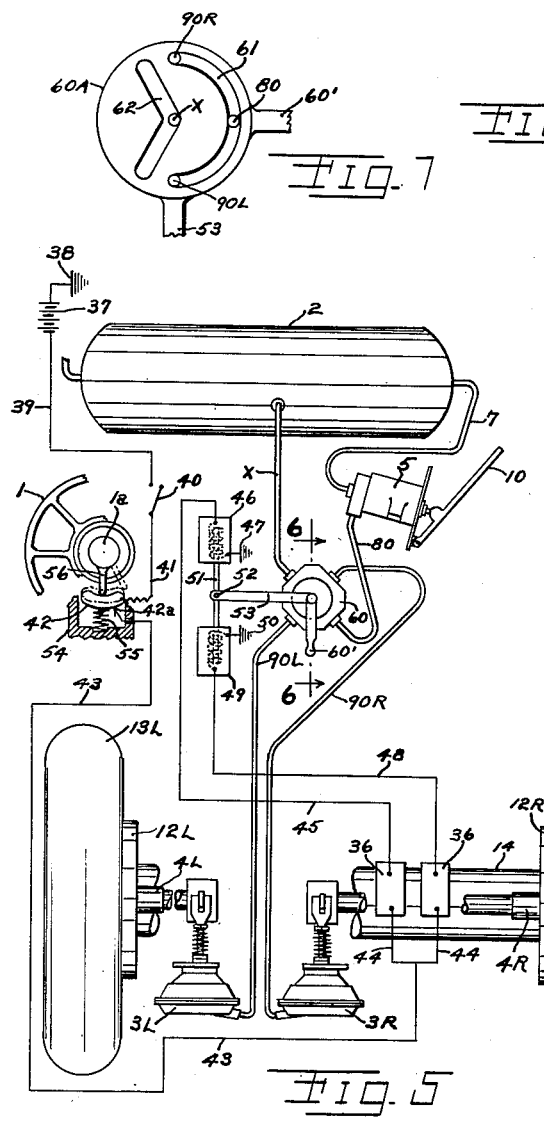
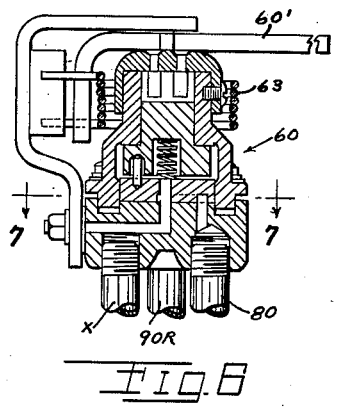

2,630,869

UNITED STATES PATENT OFFICE 2,630,869

AUTOMATIC CONTROL FOR STEERING BRAKES

Raymond Q. Armington, Shaker Heights, Ohio, assignor to The Euclid Road Machinery Co., Euclid, Ohio, a corporation of Ohio Application March 4, 1950, Serial No. 147,723

9 Claims. (Cl. 180—6.24)

1

This invention relates to improvements in an automatic control for steering brakes of wheeled vehicles.

One of the objects of the present invention is to provide novel means for applying the individual wheel brakes responsive to a difference in speed of the two driving tires on opposite sides of a wheeled vehicle.

Another object of the present invention is to provide a standard differential drive between two driving wheels on opposite sides of a vehicle, together with means automatically operable to apply a brake to one of those wheels if it should start to turn more rapidly than the other.

A further object of the present invention is to provide the improvement stated in the preceding paragraph together with means for eliminating the automatic brake control on the more rapidly turning wheel during a normal steering operation wherein it is desired that one wheel turn faster around a corner.

A further object of the present invention is the provision of means for automatically applying a brake to the faster moving of two wheels on opposite sides of a vehicle while, at the same time permitting steering assistance by manually applying a brake to the wheel on one side of a vehicle toward which a turn is being made in order to assist the turning action.

Other objects and advantages of the present invention will be apparent from the accompanying drawings and description and the essential features will be set forth in the appended claims.

In the drawings, Fig. 1 is a central sectional view through the mid-portion of a standard automotive differential drive showing my improved device in connection with one of the differentially driven shafts;

Fig. 2 is a fragmental sectional view enlarged taken along the line 2—2 of Fig. 1;

Fig. 3 is a sectional view enlarged taken along the line 3—3 of Fig. 1;

Fig. 4 is a fragmental view of a right-hand portion of the device of Fig. 1 enlarged to more clearly indicate the parts and their relationship;

Fig. 5 is a diagrammatic view of certain parts of an automotive vehicle equipped with my improved brake control device;

Fig. 6 is a fragmental sectional view enlarged taken approximately along the line 6—6 of Fig. 5; while Fig. 7 is a fragmental sectional view enlarged and somewhat diagrammatic taken approximately along the line 7—7 of Fig. 6.

2

Driving axle performance requirements, as far as off-the-highway vehicles are concerned, may be divided into two fundamentally separate elements. In the first place, there is a need for both driving wheels to drive substantially as a solid axle to travel through road conditions where the traction is bad or to get the maximum forward pull that is needed to load a self loading scraper or similar vehicle. In the second place, there is a need to individually brake or declutch the drive on one wheel while continuing to drive the wheel on the opposite side to assist in steering heavy vehicles of this type. These two requirements are directly contrary and in many currently used designs conflict with each other. A common device is to provide internal friction in the differential construction so that there is not such a great tendency for one wheel to spin in case it arrives in a slippery spot and loses traction. This internal friction in the differential may become so great as to react disadvantageously when it is attempted to steer the vehicle around a corner. All methods presently in use and known to me are inadequate compromises. The present invention aims at a more logical solution whereby the free running conventional differential is allowed to perform its usual function and in addition there is added an automatic control for applying the individual wheel brakes responsive to a difference in speeds as regards the two driving tires on opposite sides of the vehicle. The present invention automatically applies the brake on the fast wheel until it is slowed to the speed of the other wheel. My invention also permits the application of a brake to the wheel on either side of a vehicle to aid in the steering effort, an operation which is commonly in use and very desirable. Means is also provided so that when no action of the individual wheel brakes is needed, the automatic control may be shut off.

I have chosen to show my invention making use of a tractor braking control of the type shown in United States Patent No. 2,233,192 granted February 25, 1941, to George E. Armington, to which reference may be had for a more complete description of part of the underlying structure.

Referring to Figs. 5, 6 and 7 of the drawings of this application, I have shown the usual steering wheel 1, connected to a steering column 1a which in turn operates the steerable front wheels of a tractor device in the usual manner. The front wheels are not shown in order to keep the diagram simple. The rear of this vehicle is equipped with a pair of differentially driven wheels 13L and 13R, which are carried by an axle and housing 14. The wheels are provided with brake drums 12L and 12R respectively and the brake-applying cams are operated by the rock shafts shown at 4L and 4R.

Power application of the brakes is provided by means of pressure fluid stored in a receiver 2, and a pair of actuators 3L and 3R are provided, one for the brake of each wheel respectively. These actuators are of known type of standard diaphragm form, each actuating its brake through a suitable linkage including the rock shafts 4L and 4R connected respectively to the brakes at 12L and 12R.

It is contemplated that the actuators 3L and 3R will be power operated utilizing pressure fluid from a receiver 2. The power circuit includes two valves 5 and 60 arranged in series relation, the valve 5 having a connection from the receiver by line 7, being connected to the valve 60 by line 80, and the valve 60 having connection with both actuators by lines 90L and 90R respectively.

The valve 5 is of throttle type arranged to be actuated by a pedal 10 located for convenient depression by the operator of the vehicle. The valve 60 is operable by a manual 60' and has a connection X directly from the receiver 2 and independent of its connection 80 from the valve 5.

As indicated in Figs. 6 and 7, the valve structure 60 is generally of standard disc type having a valve proper 60A, the face of which is provided with an arcuate passage 61 and a V-shaped passage 62. The valve body is suitably ported so that the passage 62 has communication at all times with the line X from the receiver, the bend or apex of the passage 62 being located at the valve axis for this purpose. Ports for the lines 80, 90L and 90R are provided in the valve body at the radius of the valve passage 61 which is concentric of the valve axis, and the two arms at the passage 62 extend radially to the radius of the passage 61.

Thus, when the valve 60 is set in the position of Figs. 6 and 7, which is its neutral position, no flow may be had through the line X because the branches of V passage 62 have no outlet. But communication is established by way of the arcuate passage 61 from the line 80 to both lines 90L and 90R, so that if the pedal valve 5 be opened, both brake actuators will be energized to slow down the vehicle. The valve with its manual 60' is yieldably urged to a neutral position by a torsion spring 63 which permits valve movement in either direction about the valve axis. Clockwise or right-hand movement of the valve of Fig. 7 will cut off communication of the line 90R without disturbing communication of the line 90L with the line 80. At the same time, such adjustment will establish communication from the line X to the line 90R by way of the V passage 62, so that the right-hand brake actuator 3R will be energized. Similarly, adjustment of the valve in the opposite or left-hand direction will cause energization of the left-hand actuator 3L to apply the left brake.

The valve 60 is mounted with respect to the steering wheel 1 in such an arrangement that adjustment of its manual 60' in the direction of steering wheel adjustment, will apply the brake on the wheel at the inside of the turn desired, it being understood that manipulation of the manual 60' is optional with the operator.

In general, the operation of the device of Figs. 5, 6 and 7 includes the application of either brake individually by manipulation of manual 60' by the operator without depression of the pedal 10. Obviously, when the valve 60 is in its usual neutral position, depression of the pedal 10 will cause application of both brakes equally. It is thus possible to use the brakes 12L and 12R individually to aid in steering the vehicle or to use them both together in order to slow down or stop the vehicle. It is to this equipment which I have added my novel automatic control for braking one wheel if it turns faster than the other.

Referring now to Fig. 1, the usual vehicle propeller shaft 15 is shown turning a pinion 16 which in turn meshes with the ring gear 17. This ring gear is connected with the differential case 18 in which are rotatably mounted the differential pinions 19. These pinions in turn mesh with the differential side gears 20, one of which is splined to the shaft 21L which drives the wheel 13L and the other of which is splined to the shaft 21R which drives the wheel 13R.

A bronze friction ring 22, made in two halves, carries six contact fingers 22a which engage the internal bore 18a of the differential case so that the ring 22 tends to follow the rotation of the differential case 18. The friction ring 22 is clamped to an operating sleeve 23 by means of a clamp nut 24 which has threaded engagement with the operating sleeve at the threads 25, whereby the clamp nut may be pulled with its bevel surface 24a tightly gripping a similar surface on the exterior of ring 22. A split clamp 26, formed in four pieces, is tightly clamped to one of the axle shafts turned by the differential, in this case, the shaft 21R. To this end, an outer clamping nut 27 has threaded engagement with an inner clamping nut 28 at the threads 29 and by pulling these clamping nuts toward each other, using the threads, the beveled surfaces on the clamping nuts are drawn tightly against the split clamp 26 so as to cause the same to grip the axle 21R tightly.

Since the friction ring 22 turns at the speed of the differential case and since the split clamp 26 turns at the speed of the shaft 21R, I utilize differential rotation between these two members to operate my automatic brake control. To this end, a loose thread 30 is provided between the operating sleeve 23 and the clamping nut 27. Now if the differential begins to work and one wheel starts to move faster than the other, the operating sleeve 23 will start to move in one direction or the other depending upon which axle shaft 21L or 21R is rotating more rapidly. As the operating sleeve moves to the left or to the right as viewed in Fig. 1, I utilize this motion to apply the suitable brake to the more rapidly moving wheel 13L or 13R so as to automatically slow down the more rapidly rotating wheel. Several means, mechanical or electrical, might be used to accomplish this purpose. I have chosen to utilize electrical means as clearly described in the following paragraphs.

Referring to Figs. 1 and 4, I provide an annular rib 23a extending radially outwardly from the operating sleeve 23. A yoke 31 partially embraces the rib 23a. This yoke has a pivotal mounting at 32 on a bracket 33 which is part of a plate 34 which in turn is bolted to the axle housing 14 by the bolts 35. Mounted on the outer face of the plate 34 are two switches 36 which are of the microswitch type, that is, adapted to be operated by a very slight movement of their operating buttons 36a. Arms 31a on the yoke 31 underlie the operating buttons 36a so that a slight oscillation of the yoke 31 about its pivot 32 will operate one or the other switch buttons 36a.

Referring now to Fig. 5, a source of electric power such as a battery 37 has one side connected to ground as indicated at 38. The other side of the battery is connected through line 39, switch 40, line 41, switch 42 and lines 43 and 44 to the switches 36 which were just described a moment ago. From one of the switches 36 a line 45 leads through solenoid 46 and the energizing coil thereof to a ground connection 47. From the other switch 36 a line 48 leads through solenoid 49 and the energizing coil thereof to a ground connection 50. The armature for the solenoids 46 and 49 comprises a bar 51, the central point of which is connected at 52 to a lever 53 which is connected to the valve disc 60a so as to operate the same in a similar manner as was accomplished by the operation of the manual 60'.

The operation of the device just described for automatic control of the brakes 12L and 12R will now be apparent. With the switch 40 closed, and with the switch 42 in the full line position of Fig. 5, namely, closed, a circuit is adapted to be closed through either one of the switches 36 upon operation of its button 36a by means of the yoke 31. So long as the traction wheels 13L and 13R are travelling at the same speed, there is no differential movement between the differential case 18 and therefore the friction ring 22 and the operating sleeve 23 will turn at the same speed of rotation as the shaft 21R. There is thus no differential movement between these parts and they will remain as shown in Figs. 1 and 4. If one of the wheels 13L or 13R should strike a sandy or muddy spot so that the one wheel tends to spin faster than the other, there will be a differential movement between the differential case 18 and the parts 22 and 23 turning in unison with it and the split clamp 26 and clamping nut 27 which turn at the same speed as the axle shaft 21R. The operating sleeve 23 will then turn upon the threads 39 so as to travel either toward the left or toward the right as viewed in Figs. 1 and 4 depending upon which of the drive wheels is turning the faster. To hold the parts in place, a retainer ring 57 fits radially inside the right hand end of sleeve 23 as viewed in Figs. 1 and 4. This ring is held in place by a snap ring 58. Sleeve 23 is limited in movement toward the left by ring 57 engaging the right hand end of nut 27. It is limited in movement toward the right by shoulder 23b of sleeve 23 engaging the left hand end of nut 27. When sleeve 23 engages either of these stops, the fingers 22a frictionally rub over the surface 18a without causing further movement of sleeve 23 in the direction which caused it to engage the stop. The rib 23a will then engage one arm of the yoke 31 and cause it to oscillate slightly about its pivot point 32 so as to cause one of the lateral arms 31a to engage one of the operating buttons 36a so as to close a circuit through one of the switches 36 to one of the solenoids 46 or 49. One of these solenoids will move the valve disc 60A in the same manner as did the manual 60' clockwise, as previously described, so as to send pressure fluid to the right hand brake actuator 3R and apply the brake 12R to the wheel 13R. Similarly, energization of the other solenoid (by movement of the rib 23a in the opposite direction) will adjust the valve disc 60A in a counterclockwise direction so as to cause application of the brake actuator 3L which will apply the brake 12L to the wheel 13L. Obviously, anyone skilled in the art may connect the proper switch 36 to energize the proper solenoid so that the brake is applied to the more rapidly turning wheel. The clearance between the rib 23a and the arms of the yoke 31 partially embracing the rib on opposite sides may be so adjusted as to avoid hunting of the mechanism.

When operation of the automatic brake control mechanism was not desired, the switch 40 might be opened manually so as to disconnect this mechanism. Obviously, this might be done when rounding a corner, at which time the brake would be automatically applied by my control mechanism to the wheel 13L or 13R which was travelling on the outside of the radius as the corner was being turned. I may provide automatic mechanism for disconnecting the automatic brake control when turning a corner as will now be described. It will be noted that the spring contact member 42 is provided with a housing 54 in which is a spring 55 which urges the spring contact member 42 out of engagement with the contact 42a when the spring contact member 42 is free to be moved. I have shown an arm 56 rigid with the steering column 1a and positioned as shown in Fig. 5 when the vehicle is moving straight forward. As shown in full lines in Fig. 5, the arm 56 holds the contact 42 in circuit closing position so long as the steering column 1a is turned not more than 25 or 30 degrees from the straight line position. However, when turning a corner, the arm 56 may be moved to the dot-dash position of Fig. 5, out of contact with the member 42, whereupon the spring 55 moves the contact 42 to the dot-dash position away from the contact 42a, thus opening the energizing circuit through switches 36 to the solenoids 46 and 49. The spring 55 is a short, stiff spring actually connected to member 42 at one end and connected to housing 54 at its other end, thus permitting movement of member 42 upwardly (as viewed in Fig. 5) only to the dot-dash position there shown. By this arrangement, the automatic application of one or the other of the brakes 12L or 12R to the faster moving wheel is cut out automatically when the driver steers the vehicle around a sharp corner.

I thus have provided a device which, when operated, will automatically apply the brake to the faster rotating of two drive wheels until this wheel is slowed down to the speed of the other wheel, after which the device will return to a neutral position until the next case of differential rotation occurs. At the same time, when steering assistance is required, the steering brake wheel or manual 60' may be operated to apply a brake at one side or the other of the vehicle, as required.

All of the equipment shown requires no special machining of the axle shaft or of the differential so that my automatic brake control might be provided as optional equipment on a standard installation to be added or removed as desired.

What I claim is:

1. In a vehicle having drive wheels on opposite sides thereof and having an axle shaft for driving each wheel and having a differential drive mechanism between said shafts and having a brake for each drive wheel, the combination of an operating part operatively connected between said shafts for movement in first and second directions responsive to rotation of the left-hand and right-hand of said drive wheels respectively faster than the other, and brake applying mechanisms operatively connected between said operating part and said brakes, movement of said operating part in first and second directions respectively operating said brake applying mechanisms for said left-hand and right-hand drive wheel brakes.

2. The combination of claim 1 wherein said operating part is an operating sleeve having on the one hand frictional engagement with the differential case of said differential drive mechanism, and having on the other hand a threaded engagement with a part rigid with one of said axle shafts.

3. The combination of claim 1 including independent operator-operated means for applying each of said brakes separately, whereby said brakes may be used to aid in steering said vehicle.

4. The combination of claim 1 including a brake control system including a power source and a brake control member having first and second positions for applying a brake to one or the other of said drive wheels respectively, power means for moving said brake control member, and said brake actuating mechanisms being connected to said power means for actuating said brake control means into its first and second positions.

5. The combination of claim 1 including a power control member for actuating each of said brakes, two solenoids for operating said power member respectively into each of two positions for applying one or the other of said brakes, an electrical circuit for selectively energizing each of said solenoids and including two switches, one for each solenoid, and an operating connection between said operating part and said switches respectively responsive to movement of said operating part in said first and second directions.

6. The combination of claim 1 including a power control member for actuating each of said brakes, two solenoids for operating said power member respectively into each of two positions for applying one or the other of said brakes, an electrical circuit for selectively energizing each of said solenoids and including two switches, one for each solenoid, an operating connection between said operating part and said switches respectively responsive to movement of said operating part in said first and second direction, a steering device for said vehicle, and switch means in said circuit and operatively connected with said steering device for opening of said switch means by movement of said steering device by a predetermined amount out of its straight-ahead position.

7. In a vehicle having drive wheels on opposite sides thereof and having an axle shaft for driving each wheel and having a differential drive mechanism between said shafts, including a differential case having driving connections with said axle shafts, a brake for each drive wheel, a member having a driving connection with said case, a member having a driving connection with one of said axle shafts, a member operatively connected between said members and movable responsive to differential rotation between said members, and means for applying one of said brakes by movement of said last named member.

8. In a vehicle having drive wheels on opposite sides thereof and having an axle shaft for driving each wheel and having a differential drive mechanism between said shafts, including a differential case, a brake for each drive wheel, a sleeve surrounding one of said shafts and having a frictional driving engagement with said case, a part clampingly secured to said one of said shafts, a threaded connection between said last named part and said sleeve for moving said sleeve longitudinally of said one shaft responsive to relative rotation between said case and said one shaft, and means for applying one of said brakes by movement of said sleeve in one direction and for applying the other of said brakes by movement of said sleeve in the opposite direction.

9. The combination of claim 8 including a split ring secured to said sleeve, said ring having an internal diameter greater than the diameter of said one shaft, said split ring having friction means engaging said case, a split clamping ring adapted to clampingly engage said one shaft, and means securing said clamping means to said part.

RAYMOND Q. ARMINGTON.

REFERENCES CITED

The following references are of record in the file of this patent:

UNITED STATES PATENTS

| Number | Name | Date |
|---|---|---|
| 1,476,068 | Froelich | Dec. 4, 1923 |
| 1,950,446 | Eckroad | Mar. 13, 1934 |
| 2,080,692 | Brown | May 18, 1937 |
| 2,431,272 | Mynssen et al. | Nov. 18, 1947 |

FOREIGN PATENTS

| Number | Country | Date |
|---|---|---|
| 459,638 | Germany | May 7, 1928 |